F. B. PARKS.
TIRE PLUG INSERTER.
APPLICATION FILED DEC. 31, 1908.
1,025,203.
Patented May 7, 1912.
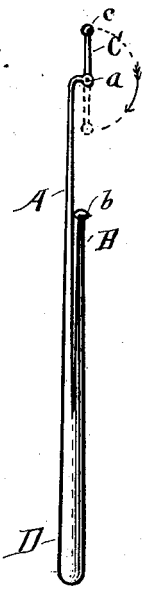
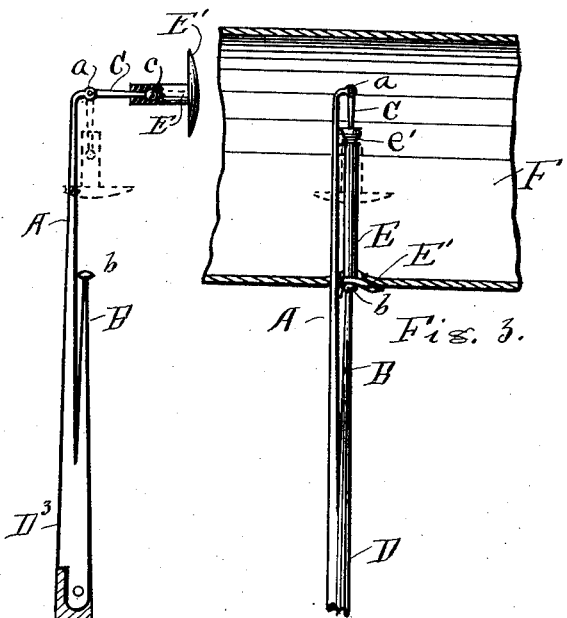
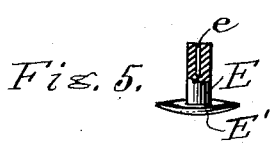
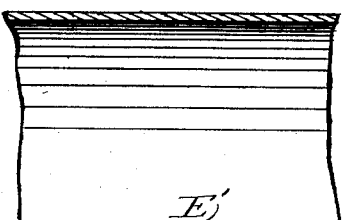
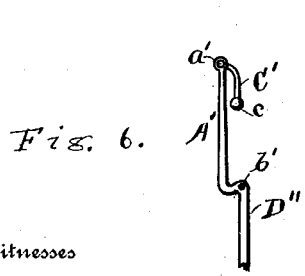
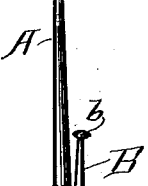
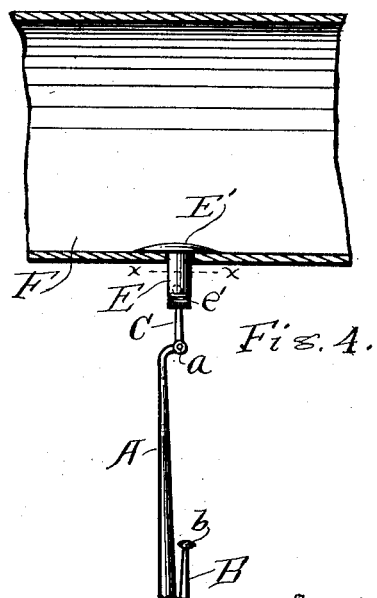
Witnesses
John C Dunton
F. L. Stewart
Inventor
Fred B. Parks
By
Ithiel J. Cilley
Attorney

UNITED STATES PATENT OFFICE.

FRED B. PARKS, OF GRAND RAPIDS, MICHIGAN.

TIRE-PLUG INSERTER.

1,025,203. Specification of Letters Patent. Patented May 7, 1912.

Application filed December 31, 1908. Serial No. 470,260.

*To all whom it may concern:*

Be it known that I, FRED B. PARKS, a citizen of the United States, residing at Grand Rapids, in the county of Kent and State of Michigan, have invented certain new and useful Improvements in Tire-Plug Inserters, of which the following is a specification.

My invention relates to improvements in appliances for inserting rubber plugs into punctures in pneumatic tires, and its objects are: first, to provide an appliance to which the stem of the plug may be so firmly secured that it may be stretched to at least twice its normal length without danger of tearing or puncturing the plug or disconnecting it from the supporting end of the device; second, to provide an implement with which the head of a plug may be forced through so small an aperture or puncture that it would be impossible to draw or force it back out of the tire; third, to provide an implement of the class stated that will permit of thoroughly covering the plug with cement before inserting it into the tire and will insert the plug without danger of slipping off, and with which the plug may be readily drawn back to place in the puncture without danger of becoming disconnected from the implement. I attain these objects by the mechanism illustrated in the accompanying drawing in which—

Figure 1 is a side view of the implement. Fig. 2 is the same with a plug placed upon the pivotal arm of the implement, shown partly in section to show the manner of attaching it, and, also, showing a knife handle attachment. Fig. 3 is a side view of the same showing the manner of inserting a plug. Fig. 4 is the same showing the plug drawn back to place in the tire, and Fig. 5 is a side view of a plug with the end of the stem shown in section to show its central aperture for the reception of the pivotal portion of the implement. Fig. 6 shows a modified form of implement, and Fig. 7 is a plan of the plug showing an aperture in the end.

Similar letters refer to similar parts throughout the several views.

This implement is made with a main long slender arm A which is bent at the end to form a pivotal bearing $a$ into which the pivotal member C is pivoted, as shown in the several figures. This pivotal member is provided, at the free end, with a small ball $c$ that is designed to enter the small aperture $e$ in the end of the stem E of the plug, as shown in Fig. 2, where the plug is securely fastened by winding it with thread $e'$ as shown in Figs. 3 and 4, back of the ball $c$ so that the ball cannot be drawn out even though great strain be placed upon the stem, as indicated in Fig. 3.

As there would be danger, many times, of drawing the stem in two, or tearing it from the head E' if it was to be drawn through the aperture, I have provided an auxiliary arm B, integral with the main arm A, that has a small head $b$ at the outer end in position to press against the head E' of the plug when the stem E has been stretched to the desired tension and, with the tension on the stem, to force the head through the aperture or puncture in the tire, as indicated in Fig. 3, and when the head has been forced through the tire and assumed the position indicated by the dotted lines in Fig. 3 the arm A is drawn out of the puncture and the plug drawn back through it to the position shown in Fig. 4 when it may be cut off, as indicated by the dotted lines $x$ $x$ in Fig. 4 and the job is complete.

In Figs. 1 and 3 the handle D is made integral with arm A, while in Fig. 2 I have shown the arm A with a pivotal bearing $D^3$ formed at the lower end, by which it is pivotally connected with the handle D' so that it may be opened and closed like a pocket knife.

In Fig. 6 I have made the equivalent of the head $b$ and the auxiliary arm B by forming the bend $b'$ between the arm A' and the handle D''. In this construction the arm A' may be made straight and the member C' bent, as shown, and pivoted to the arm A', as shown at $a'$, and exactly the same results will be attained as with the construction shown in Figs. 1, 2, and 5.

The small head $b$, or its equivalent, may be formed by bending the arm A, as shown at $b'$ in Fig. 6.

F represents a sectional view of a tire having a puncture through which the plug is to be placed.

To make this implement available it is much better to have the stem of the plug so constructed that the ball $c$ may be easily entered into a small hole or channel, as $e$ in Fig. 5, which, in manufactured plugs, may be burned in or may be made by inserting a sharp pointed wire, and for which I provide in my flasks when manufacturing plugs so that plugs manufactured by or for me are in shape for the convenient use of the implement.

What I claim as new and desire to secure by Letters Patent of the United States, is:

1. The combination in an implement for inserting plugs, of a main arm having a short member pivoted to one end, said member having an enlargement at the free end, and an auxiliary arm secured to the main arm but shorter, and a suitable handle on the implement.

2. In combination with a tire plug having a small longitudinal aperture in the end of the stem, a plug inserting implement having a main arm, a short member pivotally secured to the end of said arm, and having a small ball on the end to enter the aperture in the plug, a suitable wrapping for securing the plug to the pivotal member, an auxiliary arm shorter than the main arm, secured to and parallel therewith and having a head at the end to engage the head of the plug and force it through a puncture in a tire.

3. In combination, a tire plug having a small longitudinal aperture in the end of the stem, an implement having a long slender arm bent at the end and having a pivotal bearing formed thereon, a member pivotally secured to the end of the arm and having a small ball at the end to enter the aperture in the stem of the plug, a wrapping to secure the plug to the pivotal member, a short auxiliary arm integral with the main arm and in position to engage the head of the plug after the stem has been well stretched and force it into and through a puncture in a tire.

Signed at Grand Rapids Michigan December 19, 1908.

FRED B. PARKS.

In presence of—
I. J. CILLEY,
JOHN C. DUNTON.

---

Copies of this patent may be obtained for five cents each, by addressing the "Commissioner of Patents, Washington, D. C."